2 Sheets—Sheet 1.

J. WEICHHART.
Hay-Cutters.

No. 199,882.  Patented Jan. 29, 1878.

Attest:
Jno. L. Boone
Frank G. Brooks

Inventor:
John Weichhart
By Dewey & Co.
Attys.

N. PETERS, PHOTO-LITHOGRAPHER, WASHINGTON, D. C.

J. WEICHHART.
Hay-Cutters.

No. 199,882. Patented Jan. 29, 1878.

UNITED STATES PATENT OFFICE.

JOHN WEICHHART, OF SAN FRANCISCO, CALIFORNIA.

IMPROVEMENT IN HAY-CUTTERS.

Specification forming part of Letters Patent No. 199,882, dated January 29, 1878; application filed October 4, 1877.

*To all whom it may concern:*

Be it known that I, JOHN WEICHHART, of the city and county of San Francisco, and State of California, have invented an Improvement in Feed-Cutting Boxes; and I do hereby declare the following to be a full, clear, and exact description thereof, reference being had to the accompanying drawings.

My invention relates to an automatic arrangement for feeding straw to the knives of a feed-cutting box. The device is so arranged that it gives the straw a forward thrust after each knife passes the end of the box, thus projecting a sufficient length of straw for the succeeding knife to cut, and leaving it stationary while the knife is in the act of cutting.

Figure 1:
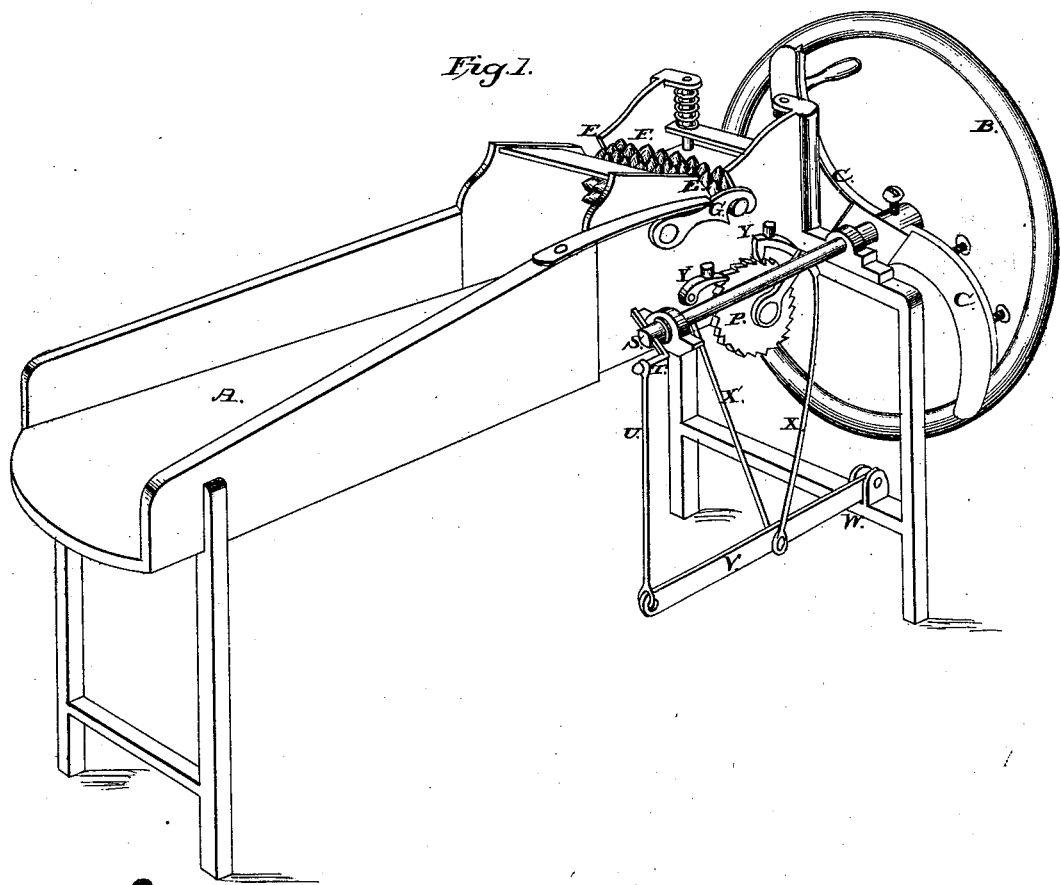
Figure 2:
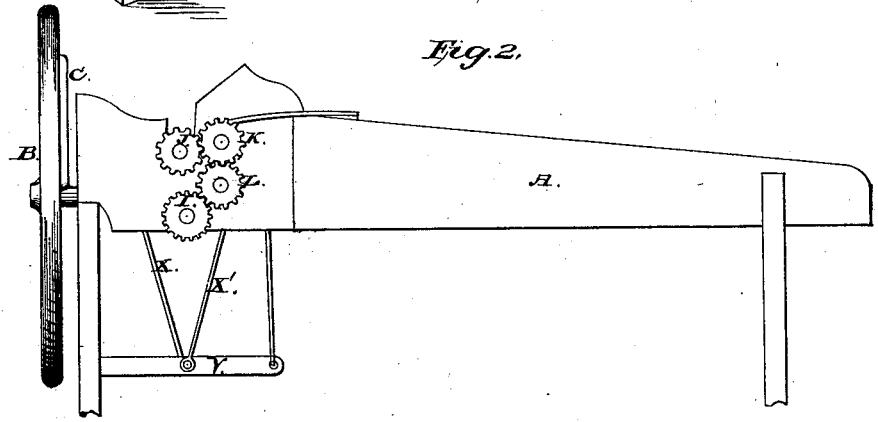
Figure 3:
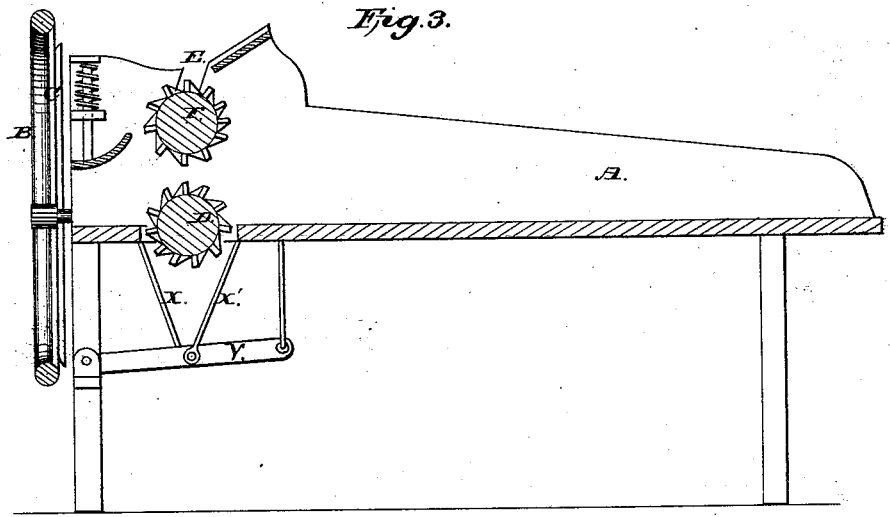
Figure 4:
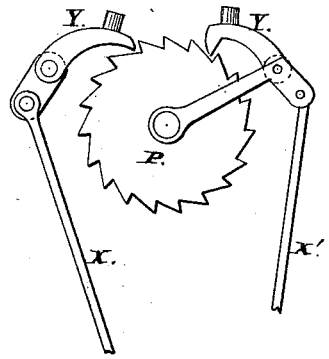

Referring to the accompanying drawings, Figure 1 is a perspective view of my hay-cutter. Fig. 2 is a side elevation of same, and Fig. 3 is a longitudinal section. Fig. 4 shows the ratchet and pawl.

Let A represent the box or trough of a feed-cutting box, and B the wheel, to the arms of which the knives or cutters C are secured. A short distance from the cutting end of the box or trough I make a transverse depression in its bottom, in which I place a toothed or corrugated roller, D, the journals of which pass through the sides of the box. The upper part of this roller will then project above the level of the bottom, as shown.

Directly above the journals of this roller I make a vertical slot, E, in the edge of each side of the box, and into these slots I drop the journals of an upper corrugated or toothed roller, F, so that this roller will be supported above the roller D and parallel with it, and so as to leave a narrow space between them. The journals of the upper roller I retain by means of a hook, G, and spring H on each side.

The hook G has one end loosely attached to the side of the box, and the hook is made on the under side of its free end, so that when it is dropped down the concavity of the hook will inclose the upper half of the journal. The spring H presses upon this hook so as to keep the journal down. This spring and hook allow the roller to move up and down and adjust itself to the thickness of straw interposed between the two rollers.

I prefer to provide the rollers with teeth which are beveled on one side, while the opposite side is straight, because they take better hold upon the straw without actually breaking or compressing the upper layer, and at the same time they give a positive feed; but other styles of teeth, or even corrugations, could be used.

To one of the journals of the lower roller D I secure a toothed wheel, I, outside of the box, and on the journals of the upper roller, on the same side, I secure a similar toothed wheel, J. The toothed wheel J engages with a similar toothed wheel, K, which is mounted on a fixed spindle just back of it, and this wheel engages with a toothed wheel, L, similarly mounted just below it, while this latter wheel engages with the wheel I.

This combination of gears connects the motion of one roller with another, so that they rotate in opposite directions, and the relation of the upper toothed wheels J to the wheel K allows the roller to be raised without disengaging the gears.

To the journal of the lower roller, on the side box opposite the gears above mentioned, I secure a ratchet-wheel, P, and this ratchet is acted upon by two pawls, Y Y, as follows: The shaft S, upon which the cutting-wheel is mounted, extends back alongside of the box, and its rear end is supported in a bearing which projects from the side of the box. A crank, T, is attached to the end of this shaft, so that it can be adjusted to give a longer or shorter throw, as desired. This crank is connected by a rod, U, with the end of a horizontal bar, V, the opposite end of which is hinged or pivoted to a cross-bar, W, below the wheel. This gives to the outer end of the bar V an up-and-down motion when the cutting-wheel is rotated. To the middle of this bar I then attach the lower ends of two rods or pawl-carriers, X X', one of which passes up on each side of the ratchet-wheel P. To the upper end of each rod X X' I attach a pawl, Y, loosely. One of these pawls engages with the ratchet-wheel P as the bar V rises, and the other as the bar is depressed, so that when the pawls are both dropped upon the wheel an impulse or semi-rotation is given to the roller D, and simultaneously, through the gears I J K L, to the upper roller F once when the bar moves up and once when it moves down. The crank is so adjusted that each impulse will be given just after a knife or cutter has passed the end of the box. If only one knife or cutter is used, only one pawl will be required.

The straw is laid in the bottom of the box and introduced between the rollers F D. It is then automatically and regularly fed to the cutters by the operation of the machine, and at the proper instant to avoid forcing it against the knives.

Having thus described my invention, what I claim, and desire to secure by Letters Patent, is—

The feed-roller D, with its ratchet-wheel P, operated by the pawls Y Y through the medium of the rods X X', lever-bar V, connecting-rod U, crank T, and cutter-wheel, in combination with the upper roller F and connecting-gears I J K L, substantially as and for the purpose described.

In witness whereof I have hereunto set my hand and seal.

JOHN WEICHHART. [L. S.]

Witnesses:
FRANK. A. BROOKS,
WILL L. TAYLOR.